United States Patent
Karlen

(10) Patent No.: US 11,801,554 B2
(45) Date of Patent: Oct. 31, 2023

(54) POWDER DEPOSITION FOR ADDITIVE MANUFACTURING

(71) Applicant: Hamilton Sundstrand Corporation, Charlotte, NC (US)

(72) Inventor: Eric W. Karlen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 765 days.

(21) Appl. No.: 16/785,077

(22) Filed: Feb. 7, 2020

(65) Prior Publication Data

US 2020/0180027 A1 Jun. 11, 2020

Related U.S. Application Data

(62) Division of application No. 15/178,438, filed on Jun. 9, 2016, now abandoned.

(51) Int. Cl.
| | |
|---|---|
| *B22F 3/16* | (2006.01) |
| *B33Y 10/00* | (2015.01) |
| *B33Y 30/00* | (2015.01) |
| *C23C 24/04* | (2006.01) |
| *B22F 10/28* | (2021.01) |
| *B22F 12/53* | (2021.01) |
| *B22F 10/50* | (2021.01) |

(52) U.S. Cl.
CPC ............... *B22F 3/16* (2013.01); *B22F 10/28* (2021.01); *B33Y 10/00* (2014.12); *B33Y 30/00* (2014.12); *C23C 24/04* (2013.01); *B22F 10/50* (2021.01); *B22F 12/53* (2021.01)

(58) Field of Classification Search
CPC ............................ B23K 15/086; B28B 1/001; B22F 2003/1057
See application file for complete search history.

(56) References Cited

U.S. PATENT DOCUMENTS

| | | | |
|---|---|---|---|
| 5,302,414 A | 4/1994 | Alkhimov et al. | |
| 5,576,069 A | 11/1996 | Chen et al. | |
| 9,649,729 B2 | 5/2017 | Nettesheim et al. | |
| 2004/0099983 A1 | 5/2004 | Dirscherl | |
| 2004/0173946 A1* | 9/2004 | Pfeifer | B29C 64/165 |
| | | | 219/121.6 |
| 2005/0233090 A1 | 10/2005 | Tapphorn et al. | |

(Continued)

FOREIGN PATENT DOCUMENTS

| | | | |
|---|---|---|---|
| DE | 102013215053 | * | 7/2013 |
| DE | 102012014841 | * | 1/2014 |

(Continued)

OTHER PUBLICATIONS

Guagliano, M. et al. "Critical review of corrosion protection by cold spray coatings." 2015. Surface engineering. 11. p. 803-815 (Year: 2015).*

(Continued)

*Primary Examiner* — Nicholas A Wang
(74) *Attorney, Agent, or Firm* — Locke Lord LLP; Daniel J. Fiorello; Gabrielle L. Gelozin

(57) ABSTRACT

An additive manufacturing method includes cold spraying a powder onto a build area to create a densified powder layer. The method can include high speed machining the densified powder layer after cold spraying to create a smooth layer.

8 Claims, 2 Drawing Sheets

(56) References Cited

U.S. PATENT DOCUMENTS

| | | | |
|---|---|---|---|
| 2006/0133947 A1* | 6/2006 | DeBiccari | B05B 7/1486 |
| | | | 419/8 |
| 2006/0165546 A1 | 7/2006 | Yamada et al. | |
| 2006/0201419 A1 | 9/2006 | Akedo et al. | |
| 2007/0183919 A1 | 8/2007 | Ayer et al. | |
| 2007/0261663 A1 | 11/2007 | Lineton et al. | |
| 2009/0202732 A1 | 8/2009 | Kruger et al. | |
| 2010/0068410 A1 | 3/2010 | Jensen et al. | |
| 2010/0173087 A1 | 7/2010 | La et al. | |
| 2010/0279022 A1 | 11/2010 | Ajdelsztajn et al. | |
| 2011/0027496 A1 | 2/2011 | Doye et al. | |
| 2011/0129379 A1 | 6/2011 | Zanon et al. | |
| 2011/0300306 A1 | 12/2011 | Mohanty | |
| 2012/0171374 A1 | 7/2012 | Calla et al. | |
| 2012/0193126 A1 | 8/2012 | Morey et al. | |
| 2013/0056187 A1 | 3/2013 | Kayamoto et al. | |
| 2014/0201964 A1 | 7/2014 | Heinrichsdorff et al. | |
| 2014/0277669 A1 | 9/2014 | Nardi et al. | |
| 2015/0246394 A1 | 9/2015 | Lancaster-Larocque et al. | |
| 2015/0261196 A1* | 9/2015 | Wilson | B22F 10/36 |
| | | | 700/119 |
| 2015/0283642 A1 | 10/2015 | Forsdike et al. | |
| 2015/0321217 A1 | 11/2015 | Nardi et al. | |
| 2015/0321422 A1 | 11/2015 | Boyer | |
| 2015/0323053 A1* | 11/2015 | El-Wardany | B22F 5/08 |
| | | | 419/38 |
| 2016/0010469 A1 | 1/2016 | Guo | |
| 2016/0090653 A1 | 3/2016 | Jensen et al. | |
| 2016/0102560 A1 | 4/2016 | Giannozzi et al. | |
| 2016/0279703 A1 | 9/2016 | Clare et al. | |
| 2017/0022614 A1 | 1/2017 | Herrmann | |
| 2017/0043395 A1 | 2/2017 | She et al. | |
| 2017/0145568 A1 | 5/2017 | Yao et al. | |
| 2017/0266727 A1 | 9/2017 | Nishino et al. | |
| 2017/0355019 A1 | 12/2017 | Karlen | |
| 2017/0368757 A1* | 12/2017 | Herzog | B33Y 10/00 |
| 2018/0010216 A1 | 1/2018 | Vo et al. | |
| 2018/0050391 A1 | 2/2018 | Maev et al. | |
| 2018/0071999 A1 | 3/2018 | Karlen | |
| 2018/0138494 A1 | 5/2018 | Birt et al. | |

FOREIGN PATENT DOCUMENTS

| | | | |
|---|---|---|---|
| WO | WO9717664 | * | 5/1997 |
| WO | WO2015106113 | * | 7/2015 |

OTHER PUBLICATIONS

"High speed machining". ASM Handbooks. vol. 16. 1989. p. 597-606 (Year: 1989).*

Villafuerte, J., "Considering Cold Spray for Additive Manufacturing", Advanced Materials & Processes, May 2014, 3 pages.

* cited by examiner

POWDER DEPOSITION FOR ADDITIVE MANUFACTURING

CROSS-REFERENCE TO RELATED APPLICATION

This application is a divisional application of U.S. patent application Ser. No. 15/178,438, filed Jun. 9, 2016, which is incorporated herein by reference in its entirety.

BACKGROUND

1. Field

The present disclosure relates to additive manufacturing, more specifically to powder deposition for additive manufacturing.

2. Description of Related Art

Current commercial powder bed laser fusion systems can create consolidated parts or structures through metallurgical bonding of powder feed stock. However, the processes are slow due to the time spent spreading or rolling a new layer of powder after each layer is joined through laser welding.

Such conventional methods and systems have generally been considered satisfactory for their intended purpose. However, there is still a need in the art for powder deposition for additive manufacturing. The present disclosure provides a solution for this need.

SUMMARY

An additive manufacturing method includes cold spraying a powder onto a build area to create a densified powder layer. The method can include high speed machining the densified powder layer after cold spraying to create a smooth layer.

The method can include inspecting the smooth powder layer after machining to determine if a defect is present. Inspecting can include a visual and/or interferometric inspection.

The method can include removing the smooth layer via high speed machining if a defect is determined to be present. The method can include applying energy to a portion of the powder layer after high speed machining if no defect is determined to be present.

In certain embodiments, applying energy includes lasing the portion of the powder layer to fuse the portion of the powder layer. Any other suitable form of energy application is contemplated herein.

Cold spraying can include cold spraying the powder on only a part area of the build area where the part is grown. In certain embodiments, the build area includes a surface of an existing part.

An additive manufacturing system can include a build area, a cold spray powder deposition system configured to cold spray powder onto the build area to create successive densified powder layer, and an energy applicator configured to fuse a portion of each densified powder layer to additively manufacture a product.

The cold spray powder deposition system can include a pressure supply, a powder feeder, and a nozzle. In certain embodiments, the nozzle is a supersonic nozzle. Any other suitable components for a cold spray powder deposition system are contemplated herein.

In certain embodiments, the energy applicator can include a laser. The build area can be movable between a cold spray station and an energy application station to interleave cold spraying and energy application. The build area can include at least one of a build platform or an existing part.

The system can include a high speed machining system configured to machine each densified powder layer. The system can include an imaging system configured to determine if any defects are present in each layer after cold spraying and/or machining. The imaging system can include an interferometric system and/or visual system.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
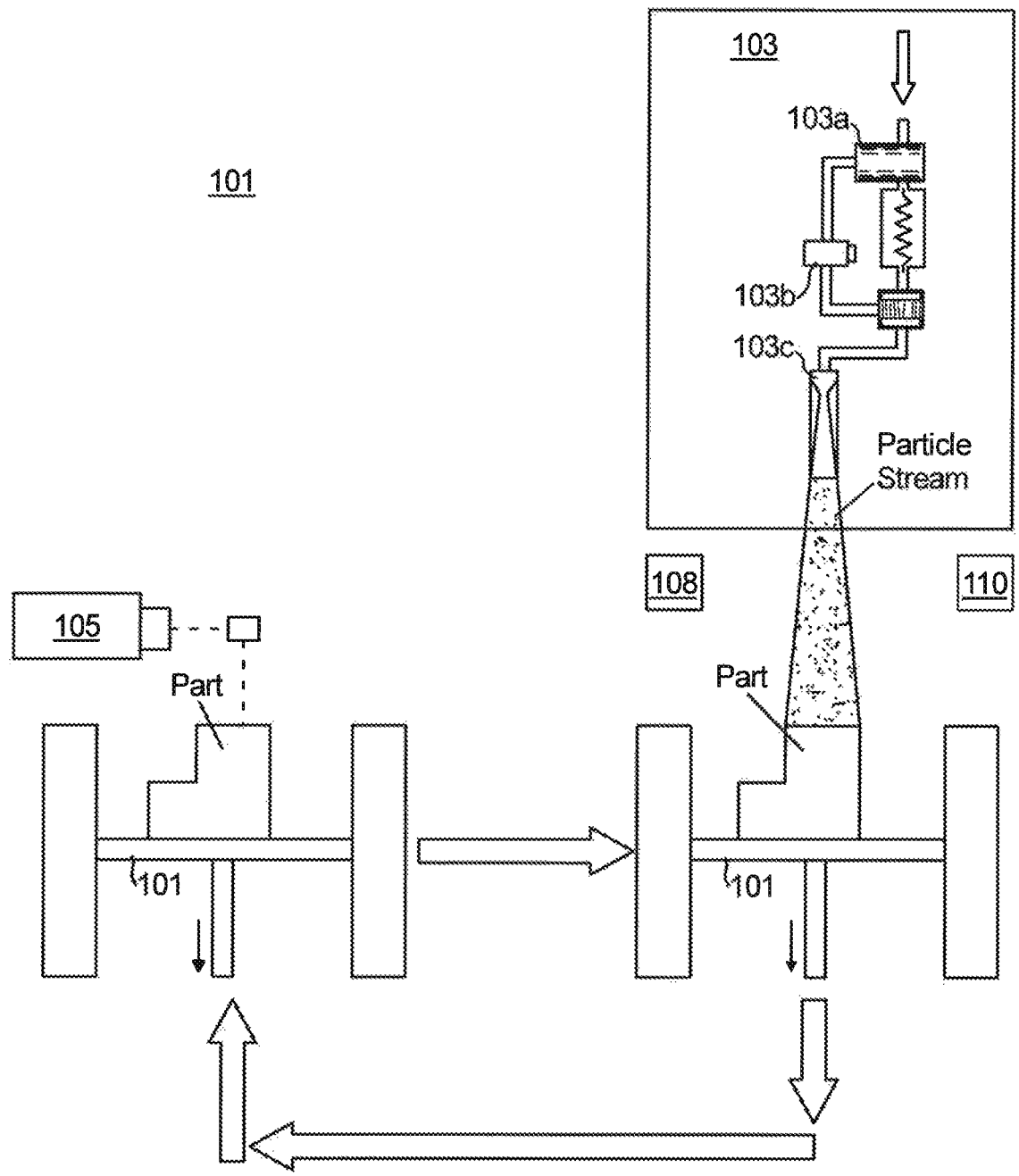
FIG. 1 is a schematic view of an embodiment of a system in accordance with this disclosure, showing the build area in two stages.
Figure 2:
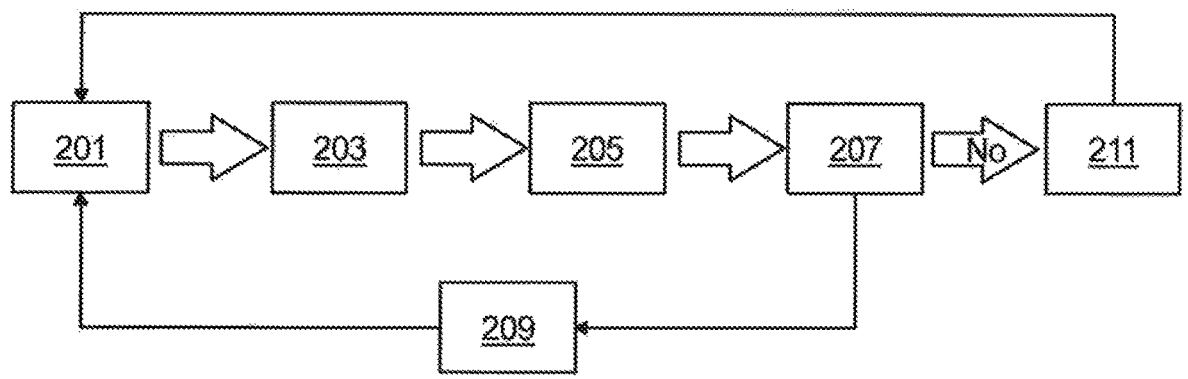
FIG. 2 is a flow chart of an embodiment of method in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. The systems and methods described herein can be used to improve build quality and reduce time consumed in additive manufacturing.

Referring to FIG. 1, an additive manufacturing system 100 can include a build area 101 and a cold spray powder deposition system 103 configured to cold spray powder onto the build area 101 to create successive densified powder layer. While the build area 101 is shown as a moveable build platform (e.g., similar to those used in a roller bed system), any suitable build area is contemplated herein (e.g., a flat surface, a non-flat surface, a stationary surface, an existing part surface). The cold spray powder deposition system 103 can include a pressure supply 103a, a powder feeder 103b, and a nozzle 103c. In certain embodiments, the nozzle is a supersonic nozzle. Any other suitable components for a cold spray powder deposition system 103 (e.g., an electric heater) are contemplated herein.

The system 100 also includes an energy applicator 105 configured to fuse a portion of each densified powder layer to additively manufacture a product. In certain embodiments, the energy applicator 105 can include a laser. Any other suitable type of energy applicator 105 is contemplated herein.

As shown, the build area 101 can be movable between a cold spray station (shown on the right of FIG. 1) and an energy application station (shown on the left of FIG. 1) to interleave cold spraying and energy application. Any other suitable arrangement (e.g., a single stage with moving systems 103, 105) that allows both cold spraying and energy application is contemplated herein.

The system 100 can further include an associated high speed machining system 108 to machine each layer to a predetermined smoothness. The high speed machining system 108 can be moveable relative to the build area 101 to apply any suitable subtractive machining to the spray deposited and/or sintered powder. Any suitable high speed machining equipment is contemplated herein.

The system 100 can include an imaging system 110 (e.g., an interferometric and/or visual system) to determine if any defects are present in each layer after deposition and/or machining. The imaging system 110 can include any suitable imaging device(s) and can be stationary or movable relative to the build area 101.

While the high speed machining system 108 and the imaging system 110 are shown positioned with the cold spray station/position, it is contemplated that one or more of the systems 108, 110 can be positioned and/or moveable for use with either or both of the energy application station and/or the cold spray station. Moreover, one or more of the cold spray powder deposition system 103, the energy applicator 105, and/or a high speed machining system 108 can be operatively connected to and/or controlled by the imaging system 110 to automatically spray, machine, and/or apply energy to the surface based on readings from the imaging system 110 (e.g., interferometric readings).

In accordance with at least one aspect of this disclosure, referring to FIG. 2, an additive manufacturing method 200 can include cold spraying a powder (e.g., at block 201) onto a build area 101 to create a densified powder layer. Cold spraying can be done to any suitable portion of the build area (e.g., a size just large enough for the build part/layer thereof, or the entire build area for example). The cold spray size can change for different layers, for example, as the layers of the part change. The method 200 can include high speed machining (e.g., at block 203) the densified powder layer after cold spraying to create a smooth layer.

The method 200 can include inspecting (e.g., at block 205) the smooth powder layer after machining to determine (e.g., at block 207) if a defect is present. Inspecting can include a visual and/or interferometric inspection.

The method 200 can include removing (e.g., at block 209) the smooth layer, e.g., via high speed machining if a defect is determined to be present. The method can include applying (e.g., at block 211) energy to a portion of the powder layer after high speed machining if no defect is determined to be present.

In certain embodiments, applying energy includes lasing the portion of the powder layer to fuse the portion of the powder layer. Any other suitable form of energy application is contemplated herein.

As described above, cold spray deposition technology can be utilized to deposit a uniform layer of powder material on a substrate or surface. The powder is compacted by cold spraying to increase density but not fully metallurgically bonded at the appropriate spraying parameters. Process parameters (e.g., pressure, nozzle location) can be adjusted such that the level of densification and metallurgical bonding can be tailored such that particles are only loosely joined, for example. An interferometry and/or visual inspection system can inspect the deposited material for layer quality. High speed machining/rework can be performed to ensure the layer quality is uniform. Laser welding or other suitable energy application can be used to melt and form a metallurgical homogeneous material, layer by layer. The process is repeated until the entire part is completely formed. Multiple parts can be in process to further improve throughput.

Interferometry, for example, is capable of evaluating small surface features. This technique can be employed to measure the as-deposited surface for thickness and irregularities before laser welding is performed to create a metallurgically homogeneous structure. A closed loop inspection process would allow the deposited surface to be re-worked before laser welding should an excessive amount of voids or other defects be present that would affect the integrity of the component.

Embodiments as described above can achieve a faster rate of manufacture as there is no need to wait to spread a new layer of powder across an entire build area. Non-spherical powder can be used to create rough form which can reduce powder costs. Also, density of cold spray deposits can be changed to provide better mechanical support during powder fusion process. Further, the result of embodiments that utilize localized deposition can be a quicker process, require less powder, and open up the possibility to build off a flat substrate (for a new part) or a surface from an existing part, for example.

The methods and systems of the present disclosure, as described above and shown in the drawings, provide for additive manufacturing systems with superior properties as described above. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An additive manufacturing method, comprising:
    cold spraying a powder onto a build area to create a densified powder layer,
    high speed machining the densified powder layer after cold spraying to create a smooth layer; and
    repeating the cold spraying and the high speed machining until a part is complete.

2. The method of claim 1, further comprising inspecting the smooth powder layer after machining to determine if a defect is present.

3. The method of claim 2, wherein inspecting includes a visual and/or interferometric inspection.

4. The method of claim 2, further comprising removing the smooth layer via high speed machining if a defect is determined to be present.

5. The method of claim 2, further comprising applying energy to a portion of the powder layer after high speed machining if no defect is determined to be present.

6. The method of claim 5, wherein applying energy includes lasing the portion of the powder layer to fuse the portion of the powder layer.

7. The method of claim 1, wherein cold spraying includes cold spraying the powder on only a part area of the build area where the part is grown.

8. The method of claim 1, wherein the build area includes a surface of an existing part.

* * * * *